United States Patent [19]

Akatsuka et al.

[11] Patent Number: 5,168,491
[45] Date of Patent: Dec. 1, 1992

[54] METHOD FOR CONTROLLING RADIATION POWER OF A LASER BEAM IRRADIATED ONTO A RECORDING MEDIUM

[75] Inventors: Yuichiro Akatsuka, Tama; Nagahiro Gocho, Hachioji, both of Japan

[73] Assignee: Olympus Optical Co., Ltd., Tokyo, Japan

[21] Appl. No.: 660,647

[22] Filed: Feb. 25, 1991

[51] Int. Cl.[5] ............................................. G11B 7/00
[52] U.S. Cl. ................................... 369/116; 369/44.24
[58] Field of Search ............... 369/116, 121, 122, 106, 369/54, 44.11, 44.23, 44.24, 44.25, 44.26, 44.27, 44.28, 44.29, 44.31, 44.32-44.36, 44.39, 117; 250/201.5, 205

[56] References Cited

U.S. PATENT DOCUMENTS

| | | | |
|---|---|---|---|
| 4,788,674 | 11/1988 | Maeda et al. | 369/116 |
| 4,796,250 | 1/1989 | Kobayashi et al. | 369/116 |
| 4,858,219 | 8/1989 | Yoshikawa | 369/116 |
| 4,937,799 | 6/1990 | Hashimoto et al. | 369/116 |
| 4,982,389 | 1/1991 | Nakao et al. | 369/116 |
| 4,989,198 | 1/1991 | Kojima et al. | 369/116 |

FOREIGN PATENT DOCUMENTS 58-40878  3/1983  Japan .
61-253651 11/1986  Japan .

Primary Examiner—Tommy P. Chin
Assistant Examiner—Thai Tran
Attorney, Agent, or Firm—Frishauf, Holtz, Goodman & Woodward

[57] ABSTRACT

A focusing signal generator sends an instruction signal to a voice coil driver. The driver drives voice coils to move an objective lens in accordance with the instruction signal. Under this state, a laser beam emitted from a laser head is irradiated on a first photoelectric converting element and a recording surface of a recording medium via an optical system, respectively. The laser beam irradiated on the recording surface of the recording medium is gathered in the recording medium in a non-focusing state. As the non-focusing state is maintained, a first signal processor provides an arithmetic processing to the electrical signal, which was output via the first photoelectric converting element, whereby the output power of the laser beam from the laser head is detected. The detected data signal is output to the laser driver. The laser driver controls the laser head, so that the laser beam having the recording output power is emitted. When such control is finished, an end signal is output to the voice coil driver from the first signal processor. The voice coil driver drives the voice coils in accordance with the end signal, and returns the objective lens to the initial position.

11 Claims, 3 Drawing Sheets

METHOD FOR CONTROLLING RADIATION POWER OF A LASER BEAM IRRADIATED ONTO A RECORDING MEDIUM

BACKGROUND OF THE INVENTION

1. Field of the Invention

The present invention relates to a method for optically recording/reproducing data to/from a recording medium such as an optical card, the method especially having a detecting process for detecting recording/reproducing power of a laser beam when data is recorded/reproduced by the laser beam.

2. Description of the Related Art

Conventionally, data recording has been performed by a laser beam irradiated onto a recording medium from a semiconductor laser, and the recording medium is physically deformed or altered by the heating function.

However, there is a case in which output power efficiency is often changed by temperature change of the surroundings of the laser beam or other ambient changes.

Therefore, a method is required for keeping constant the output power of the laser beam. For example, the output power of the laser beam is detected at a predetermined timing and the detected data is compared with a target value, and the compared data is fed-back to a semiconductor laser driving circuit. Then, in order to obtain a value which is close to the target value, the semiconductor laser is controlled so that the output power of the laser beam is constantly maintained.

As a specific example, Published Unexamined Japanese Patent Application (PUJPA) No. 58-40878 discloses a method for driving a semiconductor laser.

In the method described in PUSPA No. 58-40878 (a pulse is superimposed on a DC bias, whereby the semiconductor laser is driven), the respective light-emitting outputs of the DC bias and a DC bias to which the pulse is applied are separately monitored, and the laser beam is controlled in accordance with the result of the monitoring and the output power of the laser beam is thereby controlled.

In the above-mentioned method, in a case where data is reproduced, since the output power of the semiconductor laser is set to a predetermined constant value, the control of the semiconductor laser is relatively easily performed.

However, problem areas when the data recording is performed in such a manner that the output power of the laser beam is modulated. Due to this, in order to detect the recording power during the recording, a circuit for detecting the recording power is required. As a result, the entire circuit is enlarged.

Therefore, this prior art provides a simple method, in which that the output power of the laser beam is directly changed to the recording power.

However, since the recording power has a higher output, there are cases when the recording medium is often broken or damaged.

As an example to overcome the above-mentioned problems, there is a recording power detection method, which is disclosed in Published Unexamined Japanese Patent Application (PUJPA) No. 61-253651.

According to the above method, the semiconductor laser is controlled so that an optical head is moved to a position other than a recording region of an optical disc by head moving means, thereby directly outputting the recording power. Then, the output value is compared with the target value and detected whether the recording power is excessive or too small, thereby controlling the recording power to be close to the target value.

According to the above method, the detection of the output power is performed when the recording medium is inserted or discharged. Due to this, in a case where the environment around the laser beam is changed after inserting the recording medium and the recording power must be detected again, the recording medium must be discharged again or the optical head must be moved.

As mentioned above, according to the above method, the optical head and the recording medium are relatively moved, thereby the output power is controlled. Due to this, even if the laser beam is focused on a predetermined recording track of the recording medium, the optical head must be once moved to the outside of the recording region of the recording medium in order to detect the recording power. As a result, to perform a next access, the operation must be started again from a coarse seek operation.

SUMMARY OF THE INVENTION

An object of the present invention is to provide a method for optically recording/reproducing data to/from a recording medium, the method having a detecting process for detecting the output power of a laser beam in a simple construction without moving an optical head or the recording medium.

To attain the above object, according to the present invention, a method for optically recording/reproducing data to/from a recording medium comprises the steps of:

emitting a first laser beam having a first output power from a laser head;

changing a first irradiation range per unit area of said first laser beam to a second irradiation range by moving a movable element in a direction of an optical axis by moving means to provide a predetermined optical characteristic to said first laser beam irradiated onto the recording medium through said movable element;

receiving said first laser beam and detecting an output power of said first laser beam to send a detection signal;

controlling said laser head to emit an output power of a second laser beam having a second output power which is different from the output power of said first laser beam, in accordance with said detection signal; and moving said movable element in the direction of the optical axis by driving said moving means after said control step, to return said second irradiation range to said first irradiation range to irradiate said second laser beam on said recording medium.

Since the present invention has a step in which the first irradiation range per unit area of the first laser beam on the recording medium is changed even if the first laser beam is output from the laser head, the damage of the recording medium can be prevented even the recording medium is arranged as it is.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

A method for optically recording/reproducing data to/from a recording medium, of the first embodiment will be described with reference to the drawings.

Figure 1:
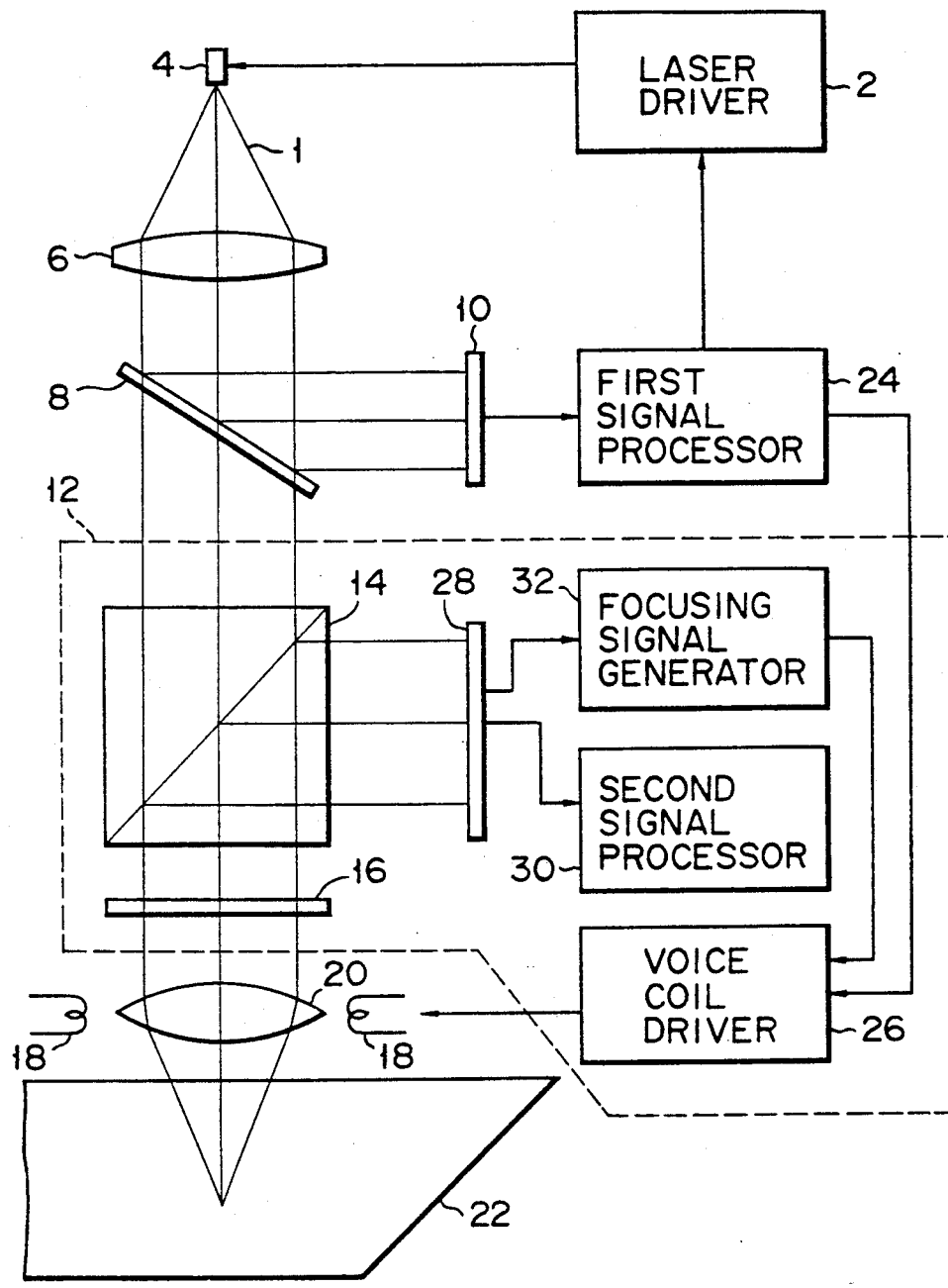
FIG. 1 is a schematic view showing the whole of a general optical system to which a method for optically recording/reproducing data to/from a recording medium according to a first embodiment of the present invention is applied.

FIG. 1 shows a general diagram of an optical system to which a method for optically recording/reproducing data to/from a recording medium according to a first embodiment of the present invention is applied.

The optical system is structured as follows:

There is provided a laser head 4 controlled by a laser driver 2 to allow a laser beam 1 having a recording or reproducing output power to be emitted.

On the emitting side of the laser head 4, there is provided a collimating lens 6 on which the laser beam 1 emitted from the laser head 4 is irradiated. The collimating lens 6 controls the laser beam 1 to be a parallel beam of light.

In the portion next to the collimating lens 6, there is provided a half-mirror 8 on which parallel laser beam 1, which was passed through the collimating lens 6, is irradiated. The half-mirror 8 reflects a part of the laser beam 1, and the reflected laser beam is optically guided to a first photoelectric converting element 10. The other portion of laser beam 1 is passed through the half-mirror 8.

The other portion of the laser beam is received by a recording/reproducing detection section 12. The recording/reproducing detection section 12 has the following structure:

There is provided a polarizing beam splitter 14 on which the other portion of the laser beam 1, which was passed through the half-mirror 8, is irradiated.

A ¼ wavelength plate 16 is provided next to the polarizing beam splitter 14.

The other portions of the laser beam 1, which was irradiated on the polarizing beam splitter 14, is passed through the polarizing beam splitter 14 and the ¼ wavelength plate 16, and then is irradiated on an objective lens 20 which is provided next to the ¼ wavelength plate 16 and has a pair of voice coils 18. Each of the pairs of voice coils 18 is respectively provided in either sides of the objective lens 20.

Moreover, there is provided a recording medium 22 at the position where the laser beam 1, which was converged by the objective lens 20, is gathered.

The first photoelectric converting element 10 receives the laser beam 1 and converts a light signal of the laser beam into an electrical signal, and outputs the electrical signal into a first signal processor 24.

The first signal processor 24 provides an arithmetic processing to the electrical signal and detects the output power of the laser beam 1 received in the first photoelectric converting element 10, and outputs the detected data signal to the laser driver 2 and to a voice coil driver 26, respectively.

The laser driver 2 controls the output power of the laser beam 1 emitting from the laser head 4 in accordance with the data signal.

The polarizing beam splitter 14 guides the laser beam 1, which is gathered in the recording medium 22 and is reflected therefrom and polarized at the ¼ wavelength plate 16, to a second photoelectric converting element 28.

The second photoelectric converting element 28 receives the laser beam 1 and converts the light signal of the laser beam 1 into an electrical signal, and outputs the electrical signal to a second signal processor 30 and a focusing signal generator 32, respectively.

The second signal processor 30 provides an arithmetic processing to the electrical signal and detects data recorded in the recording medium 22 as reproducing data.

The focusing signal generator 32 outputs an instruction signal to the voice coil driver 26 in accordance with the electrical signal in order to gather the laser beam 1 onto the recording medium in an appropriate condition.

The voice coil driver 26 drives the paired voice coils 18 in accordance with the signal respectively from the first signal processor 24 and the focusing signal generator 32, so that the objective lens 20 is moved in the direction of the optical axis.

The method for optically recording/reproducing data to/from the recording medium, of the first embodiment of the present invention is applied to the optical system having the above-mentioned structure.

The method for controlling the laser beam 1 to a predetermined output power in the recording/reproducing mode will be explained in order.

The method for controlling the laser beam 1 to the predetermined output power in the recording mode will be explained with reference to FIGS. 1 to 3.

In the above-mentioned optical system, the recording medium 22, which is in an unrecorded state, is set. In a case where a predetermined data is recorded in the recording medium 22, the focusing signal generator 32 is operated and an instruction signal is transmitted to the voice coil driver 26.

The voice coil driver 26 drives the paired voice coils 18 in accordance with the instruction signal to move the objective lens 20 in the direction of the optical axis. Thereby, the objective lens 20 is spaced from the surface of the recording medium 22 with 26 $\mu$m or more.

Under this state, the laser beam 1 is emitted from the laser head 4. The emitted laser beam 1 is irradiated respectively on the first photoelectric converting element 10 and the recording surface of the recording medium 22 via the above-mentioned optical system.

The laser beam 1, which is irradiated on the recording surface of the recording medium 22, is gathered in the recording medium in a non-focusing state.

Figure 2:
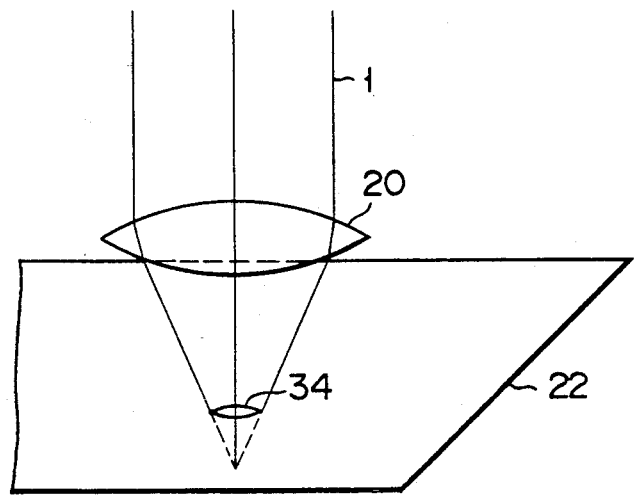
FIG. 2 is a view showing a state wherein an objective lens, which is an element of the optical system used in the above embodiment, is moved in a direction of an optical axis whereby a laser beam is irradiated on a recording medium to form a non-focusing beam spot.
Figure 3:
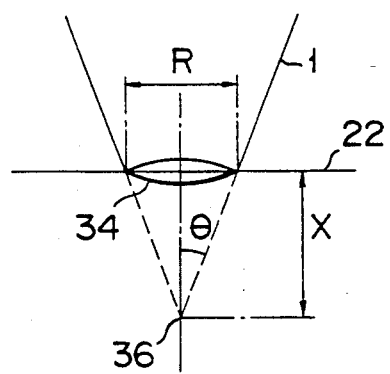
FIG. 3 is an enlarged view showing the portion close to the beam spot of FIG. 2.

FIGS. 2 and 3 show the non-focusing state. In these figures, R is a diameter of a beam spot 34 in a non-focusing state, and X is a moving distance of the objective lens 20. The moving distance is a distance X between a focusing point 36 of the laser beam 1 and the recording medium 22 as shown in FIG. 3. Moreover, r (not shown) is a diameter of the beam spot in a focusing state. Also, an angle θ against the recording medium 22 of the laser beam 1 gathered by the objective lens 20 is determined by the number of apertures (NA) of the objective lens 20, and the following relation will be established:

$NA = \sin \theta$, $X \tan \theta = R/2$, $X = R/2 \tan \theta$. Here, if the objective lens of about NA=0.5 is used, $\theta = 30°$.

Therefore, since R=30 μm if r is 3 μm, X=30 μm/2 tan 30° ≈ 26 μm.

As mentioned above, the laser beam 1 is gathered in the recording medium 22 at the beam spot 34, which is in a non-focusing state, that is, the beam spot 34 having a large diameter. Due to this, the output power of the laser beam 1 is reduced on the recording surface of the recording medium 22. As a result, heating function, which is caused by the output power of the laser beam 1, to the recording medium 22, is reduced. Thereby, the recording medium 22 is prevented from being broken or damaged.

As the non-focusing state is maintained, the first signal processor 24 provides an arithmetic processing to the electrical signal, which was output via the first photoelectric converting element 10, thereby the output power of the laser beam 1, which was emitted from the laser head 4, is detected.

The detected data signal is output to the laser driver 2. The laser driver 2 controls the laser head 4, so that the laser beam 1 having the recording output power is emitted. As a result, the laser head 4 is controlled to allow the laser beam 1 having the recording output power to be emitted.

When such control is finished, an end signal is output to the voice coil driver 26 from the first signal processor 24. The voice coil driver 26 drives the paired voice coils 18 in accordance with the end signal, and returns the objective lens 20 to the initial position.

As a result, the output power of the laser beam 1, which is emitted from the laser head 4, can be changed to the recording output power without damaging the recording medium 22.

Under the high recording output power state, the laser beam 1 is irradiated onto the recording medium 22 and is deformed or alternated by heating function, thereby performing data recording.

In a case where the data recording state is changed to the data reproducing state, the output power of the laser beam 1 in the recording mode must be reduced to the output power in the reproducing mode.

In this case, by use of the method of the above-mentioned embodiment, the reproduction of data can be continuously performed without removing the recording medium 22 in which data is recorded.

In a case where an output ratio of the recording mode to the reproducing mode is 10:1, the condition for making the influence of the laser beam, which irradiates to the recording medium 22 in the recording mode, and that of the laser beam over the recording medium 22 in the reproducing mode to be the same extent is that the irradiation area (beam spot) of the laser beam in the reproducing mode is made ten times as that of the laser beam in the recording mode, that is, the beam diameter of the laser beam in the reproducing mode is made $\sqrt{10}$ times as that of the laser beam in the recording mode.

Therefore, if the control of the output power for the reproducing mode is performed, similar to the above-mentioned steps, the laser beam 1 is emitted from the laser head 4 in a state that the objective lens 20 is moved to the non-focusing position, which is satisfied with the above condition, the output power of the laser beam 1 is detected, and controlled to the output power for the reproducing via the laser driver 2. Then, the objective lens 20 is returned to the initial position. Thereby, the reproducing is performed without damaging the recording medium 22.

Figure 4:
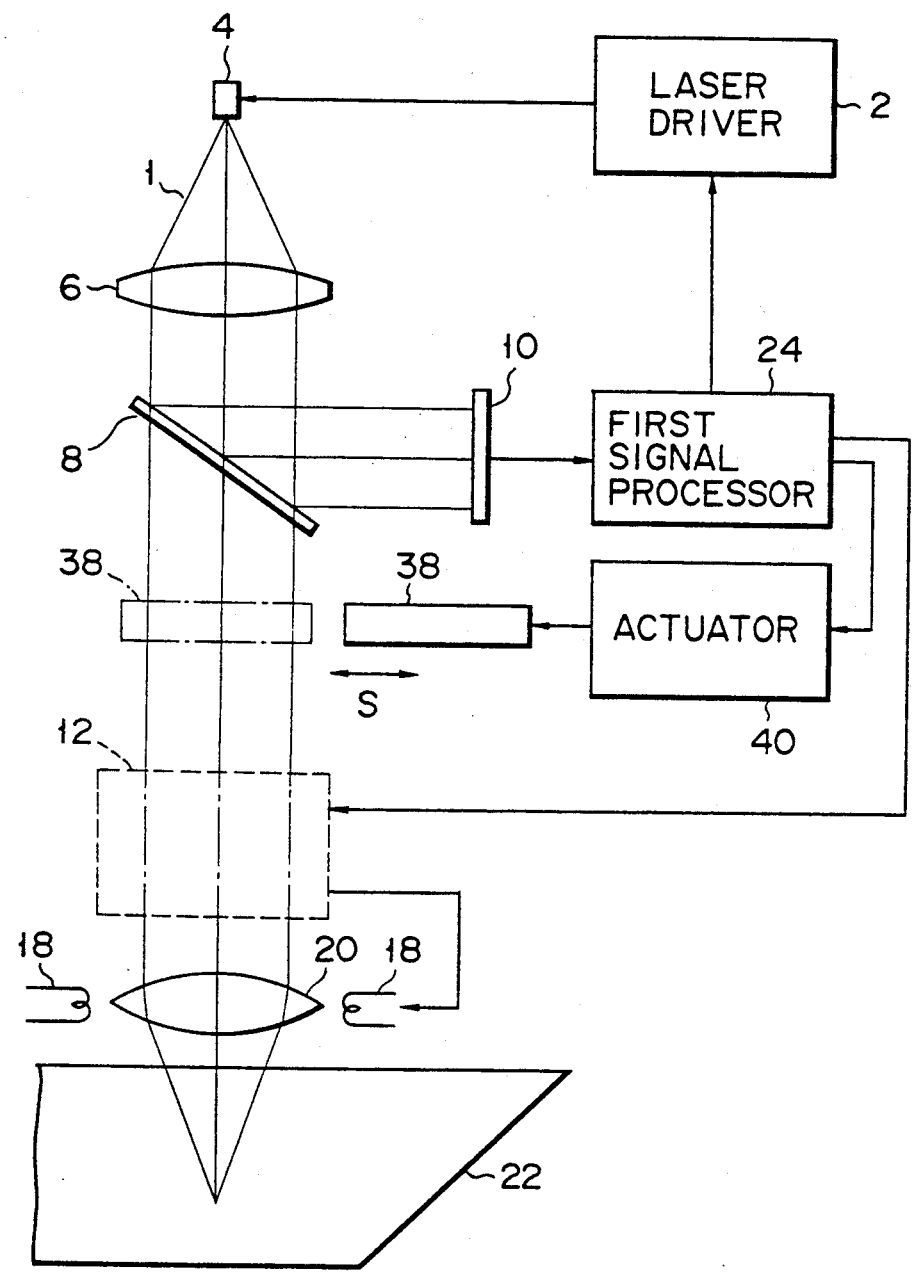
FIG. 4 is a schematic view showing the whole of a general optical system to which a method for optically recording/reproducing data to/from a recording medium of a second embodiment of the present invention is applied.

A method for optically recording/reproducing data to/from a recording medium of a second embodiment of the present invention will be explained with reference to FIG. 4.

The optical system to which the method of this embodiment is the same as the optical system of the first embodiment. Therefore, the same reference numerals are added to the same parts of the second embodiment and its explanation is omitted, and the parts, which are different from the first embodiment, will be explained.

In this embodiment, one shielding plate 38 is provided between the collimating lens 6 of the optical system and the recording/reproducing detection section 12. The shielding plate 38 is made of a material such as ND filter, which reduces the amount of transmission light, or metal, which shields the transmission of the laser beam.

In the shielding plate 38, there is used an actuator 40 connected to an external power source (not shown). In the actuator 40, a piezo element or a solenoid is used. By use of the actuator 40, the shielding plate 38 is controlled to reciprocate between a first position, where the shielding plate 38 is located on the optical path of the laser beam 1 to shield the laser beam 1, and a second position, where the shielding plate 38 leaves the optical path to allow the laser beam 1 to be irradiated onto the recording medium 22, i.e., the shielding plate 38 reciprocates as shown by arrow S in FIG. 4

According to the above-structured optical system, in a case where the data recording/reproducing is performed, the actuator 40 is operated and the shielding plate 38 is moved, thereby the shielding plate 38 is arranged on the optical path.

Sequentially, the laser beam 1 is emitted from the laser head 4. However, since the shielding plate 38 is arranged on the optical path, the laser beam 1 is shielded at that place, and not irradiated onto the recording medium 22.

Under this state, the output power of the laser beam 1 is detected via the first signal processor 24.

The detected data signal is output to the laser driver 21, and the laser head 4 is controlled so that the laser beam 1 having recording/reproducing output power is emitted.

After finishing the above control, an end signal is output to the actuator 40 from the first signal processor 24, and the shielding plate 38 is moved.

As a result, the laser beam having a predetermined output power is gathered in the recording medium 22 and data recording/reproducing is performed.

In the above-mentioned embodiment, reproducing is also performed without damaging the recording medium 22.

The above first and second embodiments are not limited to the above-mentioned structure. For example, even when the output power of the laser beam is changed during recording or reproducing, the output power can be easily controlled to a predetermined output power by setting the laser beam to be in the non-focusing or shielded state.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method for optically recording data on and reproducing data from a recording medium by controlling an irradiation power of a laser beam, comprising the steps of:

emitting a laser beam having a first power level from a laser head for recording data on the recording medium;

positioning a light transmitting movable element in an optical path between the laser head and the recording medium so that the first power level of the laser beam is transmitted through the movable element, is irradiated onto the recording medium and forms a laser beam spot on the recording medium;

changing a first diameter of the laser beam spot irradiated onto the recording medium through the movable element to a second diameter of the laser beam spot, to thereby change the amount of light irradiated onto a given area of the recording medium, the first diameter of the laser beam spot being changed to the second diameter of the laser beam spot by moving the movable element in a given direction of an optical axis by use of a moving means, said movable element providing the first power level of the laser beam with a predetermined optical characteristic;

receiving the laser beam and detecting the first power level of the received laser beam and then generating a detection signal in response to the detected first power level of the received laser beam;

controlling said laser head responsive to the detection signal to change the first power level of the laser beam to have a second power level, said second power level being provided for reading data from the recording medium, said second power level being different from the first power level of said laser beam,;

generating a completion signal upon completion of the controlling step; and moving said movable element in a direction opposite to said given direction by driving said moving means, after receiving the completion signal that indicates completion of the controlling step, to change said second diameter of the laser beam spot to said first diameter of the laser beam spot and to enable said second power level of the laser beam to irradiate said recording medium to facilitate reading of data from the recording medium.

2. The method according to claim 1, wherein said movable element comprises an objective lens that is movable in the given direction of an optical axis and in the direction opposite to said given direction.

3. The method according to claim 2, wherein said changing step comprises moving said objective lens in the given direction of the optical axis with said moving means so that said second diameter of the laser beam spot irradiates a larger area of said recording medium than does the first diameter of the laser beam spot.

4. The method according to claim 2, wherein: said moving step comprises moving said objective lens in the direction opposite to the given direction; and setting said second diameter of the laser beam spot to be the same as said first diameter of said laser beam spot.

5. A method according to claim 1, further comprising the steps of:

shielding at least a portion of said first power level of the laser beam irradiated onto the recording medium with shielding means which provides a predetermined optical characteristic to said first power level of the laser beam; and driving said shielding means after receiving the completion signal generated upon completion of the controlling step and irradiating said second laser beam power level onto said recording medium.

6. The method according to claim 5, wherein said shielding means includes an objective lens.

7. The method according to claim 5, wherein said shielding means includes:

a shielding plate for shielding said first power level of said laser beam from being optically transmitted to said recording medium; and an actuator for moving said shielding plate between a position where the optical path is shielded and another position, when said second power level of the laser beam is to be irradiated on said recording medium.

8. The method according to claim 2, wherein:

the objective lens has first and second end portions;

said moving means comprises first and second voice coils, respectively positioned at each of the first and second end portions of said objective lens, said voice coils moving said objective lens in the given direction and in the direction opposite to the given direction; and further comprising the step of driving the voice coils with a voice driver after receiving the completion signal generated upon completion of the controlling step, said voice coil driver driving said voice coils to move the movable element within a predetermined range.

9. The method according to claim 1, wherein:

the movable element comprises laser beam focusing means; and the movable element is moved in the moving step from a first position where the first diameter of the laser beam spot is unfocused to a second position where the first diameter of the laser beam spot is focused on said recording material, thereby enabling recording of data on said recording medium without damaging the recording medium.

10. The method according to claim 9, wherein:

the movable element is moved in the moving step along the optical path from the first position to the second position when data is to be read from the recording medium and the recording medium is irradiated with the second power level.

11. The method according to claim 1, wherein recording of data on the recording medium is enabled by moving the movable element along the optical axis to focus the laser beam on the recording medium, such that a power irradiated on the given area of the recording medium is focused into a smaller area than said given area on said recording medium.

* * * * *